(12) United States Patent
Iwasaki

(10) Patent No.: US 7,370,737 B2
(45) Date of Patent: May 13, 2008

(54) DISC BRAKE FOR A VEHICLE

(75) Inventor: Masaru Iwasaki, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 175 days.

(21) Appl. No.: 11/090,017

(22) Filed: Mar. 28, 2005

(65) Prior Publication Data

US 2005/0217951 A1 Oct. 6, 2005

(30) Foreign Application Priority Data

Mar. 30, 2004 (JP) ............................. 2004-097668
Mar. 30, 2004 (JP) ............................. 2004-099515

(51) Int. Cl.
*F16D 65/02* (2006.01)
(52) U.S. Cl. ................. 188/73.45; 188/73.46
(58) Field of Classification Search .... 188/73.1–73.45, 188/370, 73.46, 73.47
See application file for complete search history.

(56) References Cited

U.S. PATENT DOCUMENTS

| | | | | |
|---|---|---|---|---|
| 3,081,843 A | * | 3/1963 | Dotto et al. | 188/73.34 |
| 4,511,020 A | * | 4/1985 | Williams | 188/73.39 |
| 5,205,383 A | * | 4/1993 | Terashima | 188/73.45 |
| 5,259,484 A | * | 11/1993 | Idesawa et al. | 188/73.45 |
| 6,296,085 B1 | * | 10/2001 | Yukoku | 188/73.36 |

FOREIGN PATENT DOCUMENTS

JP 2004-28304 1/2004

OTHER PUBLICATIONS

English Language Abstract of JP 2004-28304.

* cited by examiner

*Primary Examiner*—Christopher P. Schwartz
(74) *Attorney, Agent, or Firm*—Greenblum & Bernstein, P.L.C.

(57) ABSTRACT

A disc brake for a vehicle has a caliper body including an acting section having a cylinder hole and provided on a first side of a disc rotor, a reacting section on a second side of the disc rotor and a bridge section connecting the acting section with the reacting section, a pair of friction pads, a caliper bracket fixed to a vehicle body via a pair of mounting bolts, the caliper bracket having a mount hole for the mounting bolt and a torque receiving face and provided on both sides of the caliper bracket in a circumferential direction of the disc rotor and a pair of slide pins wherein a center of the mount hole of the mounting bolt and a center of the cylinder hole are located in an area defined between the first and second base lines.

20 Claims, 10 Drawing Sheets

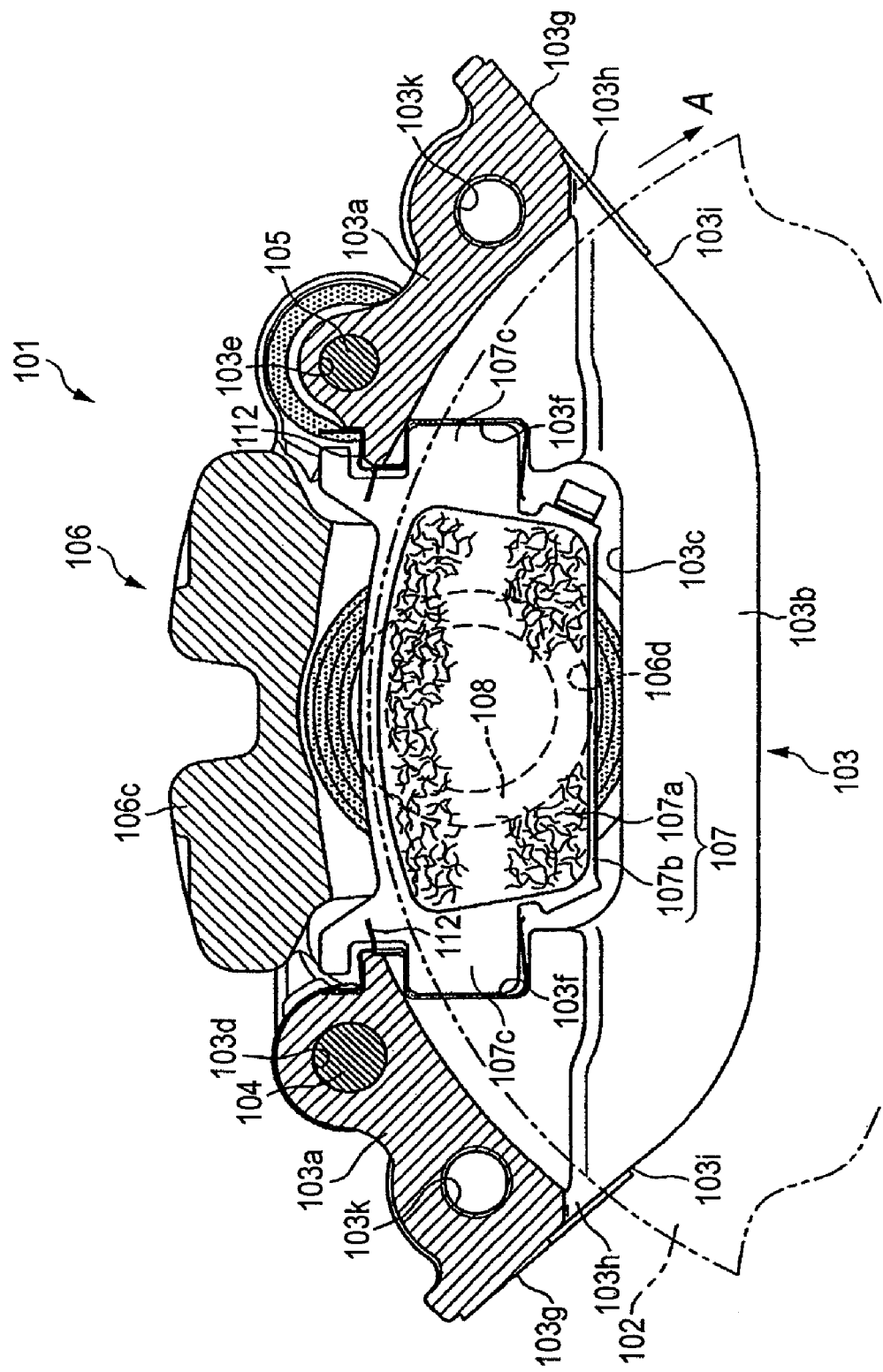

DISC BRAKE FOR A VEHICLE

The present invention claims foreign priority to Japanese patent applications no. P.2004-97668 and P.2004-99515, filed on Mar. 30, 2004, the contents of which are incorporated herein by references.

BACKGROUND OF THE INVENTION

1. Field of the Invention

The present invention relates to a disc brake for a vehicle incorporated into an automobile or motorcycle. More particularly, the present invention relates to a pin-slide type disc brake for a vehicle.

2. Description of the Related Art

The pin-slide type disc brake is typically composed as follows. A caliper body, to which an acting section provided on one side of a disc rotor and a reacting section provided on the other side of the disc rotor are integrally connected by a bridge portion which strides across the outside of the disc rotor, is supported by a caliper bracket, which is fixed to a vehicle body at one side portion of the disc rotor, by a pair of slide pins so that the caliper body can slide in axial direction of the disc, and a pair of frictional pads are arranged between the acting section and the reacting section while the disc rotor is being interposed between the pair of frictional pads, and further a torque receiving section for receiving a braking torque given from the frictional pads is provided in the caliper bracket. The disc brake for a vehicle is fixed to the vehicle body in such a manner that mounting holes for mounting bolts are formed in the vehicle attaching section provided in the caliper bracket and the caliper bracket is fastened to the vehicle body by mounting bolts which are inserted into the mounting holes for mounting bolts.

Torque receiving faces for receiving a braking torque given from the frictional pad are provided on both sides of the caliper bracket in the circumferential direction of the disc rotor being opposed to each other. A torque transmitting section, which is formed in the frictional pad, is made to contact with the torque receiving face so that the braking torque given from the frictional pad can be received by the caliper body. (For example, see Japanese Patent Unexamined Publication no. JP-A-2004-28304.)

In the disc brake described above, the vehicle body attaching section of the caliper bracket at a rotation come-out side, which is defined such that a portion of the disc rotor near the rotation come-out side moves apart from the caliper body when the vehicle runs forward, is arranged close to the torque receiving section, and the mounting bolt is attached close to the torque receiving section. On the other hand, the vehicle body attaching section at a rotation come-in side, which is defined such that a portion of the disc rotor near the rotation come-in side approaches to the caliper body when the vehicle runs forward, is arranged on the inner circumferential side of the disc rotor in respect to the torque receiving section, and the mounting bolt is attached at a position apart from the torque receiving section. Therefore, at the time of braking, the caliper bracket is given a load in such a manner that the caliper bracket is tilted and twisted. Accordingly, the brake feeling is deteriorated. Further, there is a possibility that the frictional pads are partially abraded and disadvantageously dragged. For the above reasons, it is necessary to enhance the attaching strength of the caliper bracket to the vehicle body so as to prevent the tilt and twist of the caliper bracket in the axial direction of the disc. Therefore, in the related art, the wall thickness of the caliper bracket must be increased, which increases the weight and the size of the caliper bracket. As a result, the manufacturing cost of the disc brake is raised.

Moreover, in the disc brake described above, the friction pads, a reacting pawl provided on the reacting section and a portion of the caliper bracket located on the reacting section side are composed into a complicated shape in which recess portions and protruding portions are formed. Therefore, when the disc brake is used in a condition in which earth and sand tend to get into the periphery of the disc brake, the earth and sand, which have gotten into the periphery of the friction pad, are caught by the complicated recess portions and protruding portions. Accordingly, it becomes late that the earth and sand are discharged from the periphery of the friction pad, and the earth and sand temporarily stay in the periphery of the friction pad. In this case, although it is a temporary phenomenon, the friction pad bites the earth and sand, and the brake feeling is deteriorated and further the dragging of the friction pad occurs.

SUMMARY OF THE INVENTION

Therefore, it is one of objects of the present invention to provide a disc brake for a vehicle that while the increases in the weight and the size of a caliper bracket are being suppressed, a tilt and a twist of the caliper bracket in the axial direction of the disc rotor are effectively suppressed at the time of braking so that the brake feeling can be enhanced and it is possible to suppress the frictional pads from being partially abraded and disadvantageously dragged.

Further, it is one of the other objects of the present invention to provide a disc brake for a vehicle that even when the disc brake is used in a condition in which earth and sand relatively easily get into the periphery of the brake, the earth and sand, which have gotten into the periphery of the brake, can be easily discharged from the brake device so that the deterioration of the brake feeling can be prevented and the occurrence of dragging of the brake can be suppressed.

In order to achieve the above object, according to a first aspect of the present invention, there is provided a disc brake for a vehicle, comprising:

a caliper body including:
  an acting section having a cylinder hole and provided on a first side of a disc rotor;
  a reacting section provided on a second side of the disc rotor; and
  a bridge section striding across an outside of the disc rotor and integrally connecting the acting section with the reacting section;

a pair of frictional pads provided between the acting section and the reacting section through the disc rotor so as to oppose each other;

a caliper bracket fixed to a vehicle body via a pair of mounting bolts, the caliper bracket having:
  a mount hole for the mounting bolt; and
  a torque receiving face which receives braking torque from the frictional pad and provided on both sides of the caliper bracket in a circumferential direction of the disc rotor so as to oppose to each other; and a pair of slide pins supporting the caliper body so that the caliper body is capable of sliding in an axial direction of the disc rotor, wherein a first base line is defined so as to pass through both out side faces of the torque receiving face, the out side is defined relative to radial direction of the disc rotor, a second base line is defined so as to pass through both inner side faces of the torque receiving face, the out side is defined relative to the radial direction of the disc rotor and a center of the mount hole of the mounting bolt and a center of the cylinder hole are located in an area defined between the first and second base lines.

According to a second aspect of the present invention as set forth in the first aspect of the present invention, it is preferable that the torque receiving face is formed so as to be parallel with a third base line which passes at the center of the cylinder hole and is perpendicular to an axis of the disc rotor.

According to a third aspect of the present invention as set forth in the first aspect of the present invention, it is more preferable that the first and the second base lines are perpendicular to the third base line which passes at the center of the cylinder hole and is perpendicular to an axis of the disc rotor.

According to a fourth aspect of the present invention as set forth in the first aspect of the present invention, it is furthermore preferable that the frictional pad is supported on the torque receiving face via a retainer.

According to a fifth aspect of the present invention as set forth in the first aspect of the present invention, it is suitable that the frictional pad provided on the reacting section has a frictional pad inner end face which is located at a radial direction inner side of the disc rotor, a reacting pawl provided on the reacting section has a reacting pawl inner end face which is located at the radial direction inner side of the disc rotor, the caliper bracket has a caliper bracket inner end face, which is located at the radial direction inner side of the disc rotor, on a reacting section side, and the frictional pad inner end face, the reacting pawl inner end face and the caliper bracket inner end face are substantially linearly arranged.

According to a sixth aspect of the present invention as set forth in the fifth aspect of the present invention, it is more suitable that the caliper bracket has both reacting section side end faces which are located at both ends of the circumferential direction of the disc rotor and provided on the reacting section side, both of the reacting section end faces are formed into inclined faces in such a manner that an outside of the caliper bracket in the radial direction of the disc rotor expands relative to the caliper bracket inner end face.

According to a seventh aspect of the present invention as set forth in the sixth aspect of the present invention, it is further suitable that the caliper bracket has both acting section side end faces which are located at both ends of the circumferential direction of the disc rotor and provided on the acting section side of the caliper bracket, and both of the acting section side end faces are formed in accordance with the inclined face.

According to an eighth aspect of the present invention as set forth in the seventh aspect of the present invention, it is furthermore suitable that the caliper bracket has a connecting arm which connects both of the acting section side end face to both of the reacting section side end face, respectively, and both end faces of the connecting arm in the circumferential direction of the disc rotor are formed in accordance with the inclined face.

According to a ninth aspect of the present invention as set forth in the eighth aspect of the present invention, it is suitable that the connecting arm is provided only on the acting section side of the caliper bracket.

According to a tenth aspect of the present invention as set forth in the fifth aspect of the present invention, it is suitable that the frictional pad inner end face, the reacting pawl inner end face and the caliper bracket inner end face are formed into substantially flat faces.

According to an eleventh aspect of the present invention, there is provided a disc brake for a vehicle, comprising:

a caliper body having:

an acting section and a reacting section which are arranged on both sides of a disc rotor being opposed to each other, the reacting section having a reacting pawl; and a bridge section striding across an outside of the disc rotor and connecting the acting section with the reacting section;

a caliper bracket fixed to a vehicle body and supporting the caliper body via a pair of slide pins so that the caliper body is capable of sliding in an axial direction of the disc rotor, and a pair of frictional pads provided between the acting section and the reacting section through the disc rotor so as to oppose to each other, wherein the frictional pad on the reacting section has a frictional pad inner end face which is located at a radial direction inner side of the disc rotor, the reacting pawl provided on the reacting section has a reacting pawl inner end face which is located at a radial direction inner side of the disc rotor, the caliper bracket has a caliper bracket inner end face, which is located at the radial direction inner side of the disc rotor, on a reacting section side, and the frictional pad inner end face, the reacting pawl inner end face and the caliper bracket inner end face are substantially linearly arranged.

According to a twelfth aspect of the present invention as set forth in the eleventh aspect of the present invention, it is preferable that the caliper bracket has both reacting section side end faces, which are located at both ends of the circumferential direction of the disc rotor and provided on the reacting section side, the reacting section end faces are formed into inclined face in such a manner that an outside of the caliper bracket in the radial direction of the disc rotor expands relative to the caliper bracket inner end face.

According to a thirteenth aspect of the present invention as set forth in the twelfth aspect of the present invention, it is more preferable that the caliper bracket has both acting section side end faces, which are located at both ends of the circumferential direction of the disc rotor and provided on the acting section side of the caliper bracket are formed in accordance with the inclined face.

According to a fourteenth aspect of the present invention as set forth in the thirteenth aspect of the present invention, it is preferable that the caliper bracket has a connecting arm which connects both of the acting section side end faces with both of the reacting section side end faces, respectively, and both end faces of the connecting arm in the circumferential direction of the disc rotor are formed in accordance with the inclined face.

According to a fifteenth aspect of the present invention as set forth in the fourteenth aspect of the present invention, it is preferable that the connecting arm is provided only on the acting section side of the caliper bracket.

When the disc brake is composed as described above, the braking torque received on the torque receiving face of the caliper bracket can be directly received by the mounting bolt attached at a position close to the torque receiving face.

Further, since a pair of mounting blots are arranged on a substantially straight line on both sides of the cylinder center, the caliper bracket can be attached to the vehicle body by these mounting bolts being well balanced. Accordingly, a tilt and a twist in the axial direction of the disc of the caliper bracket, which are caused at the time of braking operation, can be effectively suppressed. Due to the foregoing structure, the brake feeling can be enhanced. Further, the occurrence of partial abrasion and drag of the frictional pads can be suppressed. Furthermore, since the mounting bolt functions as a reinforcing member, while the increases in the weight and the size of the caliper bracket are being suppressed, the attaching strength of the caliper bracket to the vehicle body can be enhanced.

On top of this, when the friction pad on the reacting side, the reacting pawl and each inner end face of the caliper bracket are linearly arranged as described above, the reacting section side can be made into a simple state of the structure. Therefore, even when earth and sand get into the periphery of the friction pad, it is possible to quickly discharge the earth and sand from the periphery of the friction pad. When both end faces of the caliper bracket are formed into an inclined face, the earth and sand can be more smoothly discharged. Especially when the connecting arm is provided only on the acting section side, the earth and sand seldom stay on the reacting section side. Accordingly, the earth and sand can be more smoothly discharged from the reacting section side.

BRIEF DESCRIPTION OF THE DRAWINGS

FIG. 10 is a sectional view taken on line X-X in FIG. 9.

DETAILED DESCRIPTION OF THE PREFERRED EMBODIMENTS

Figure 1:
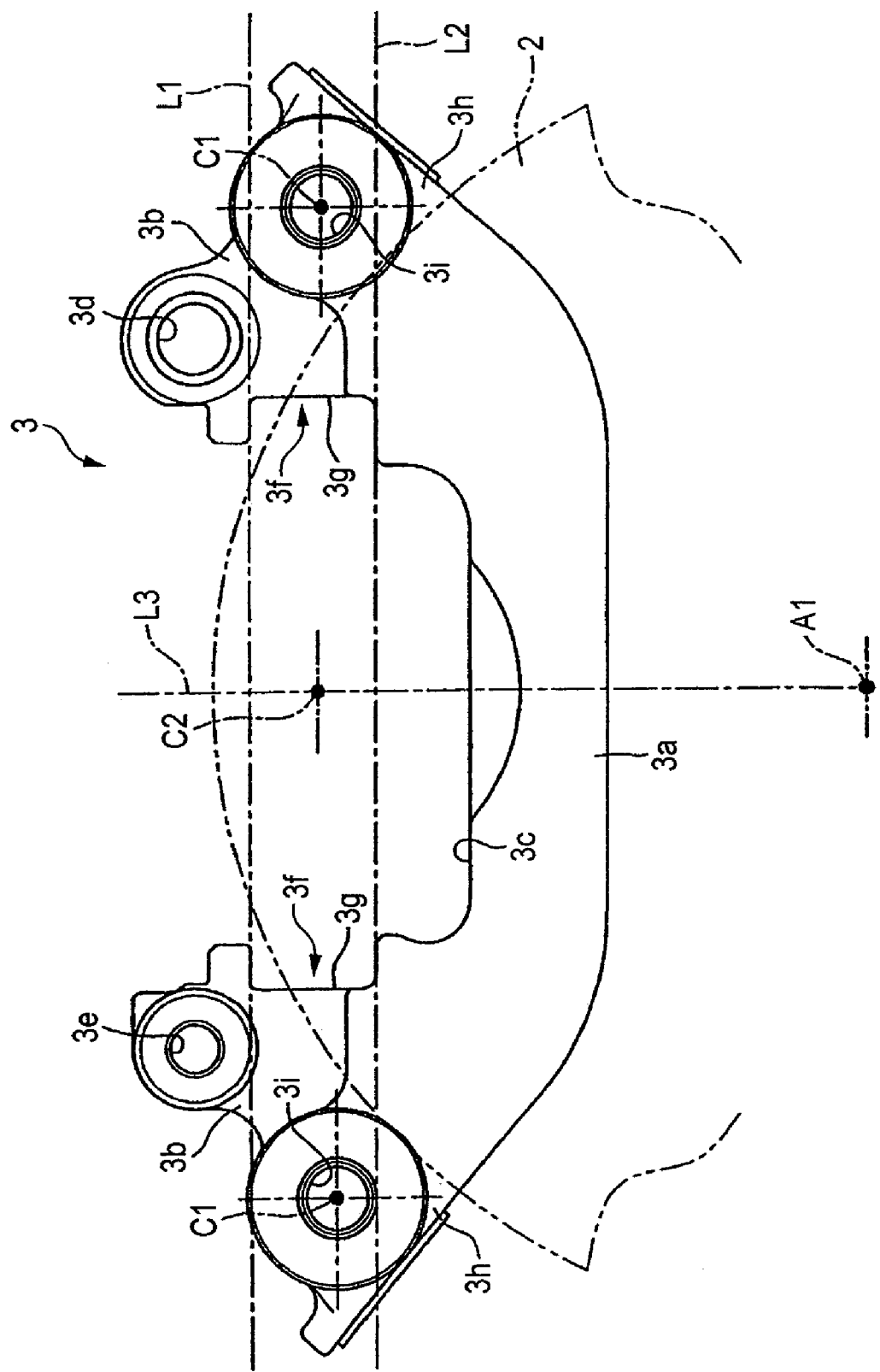
FIG. 1 is a front view showing a caliper bracket of the first embodiment of the present invention.
Figure 2:
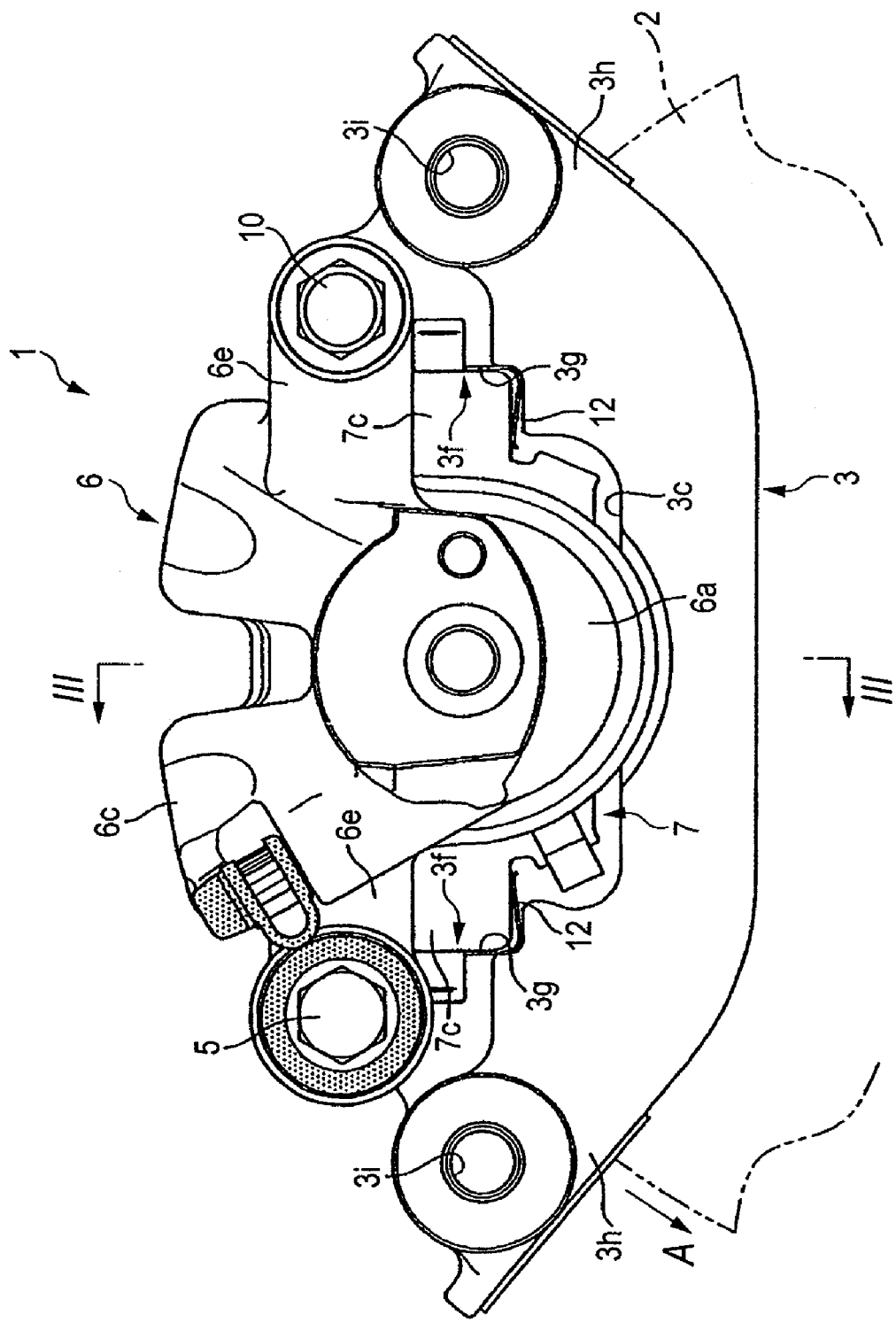
FIG. 2 is a front view showing a disc brake of the first embodiment of the present invention.
Figure 3:
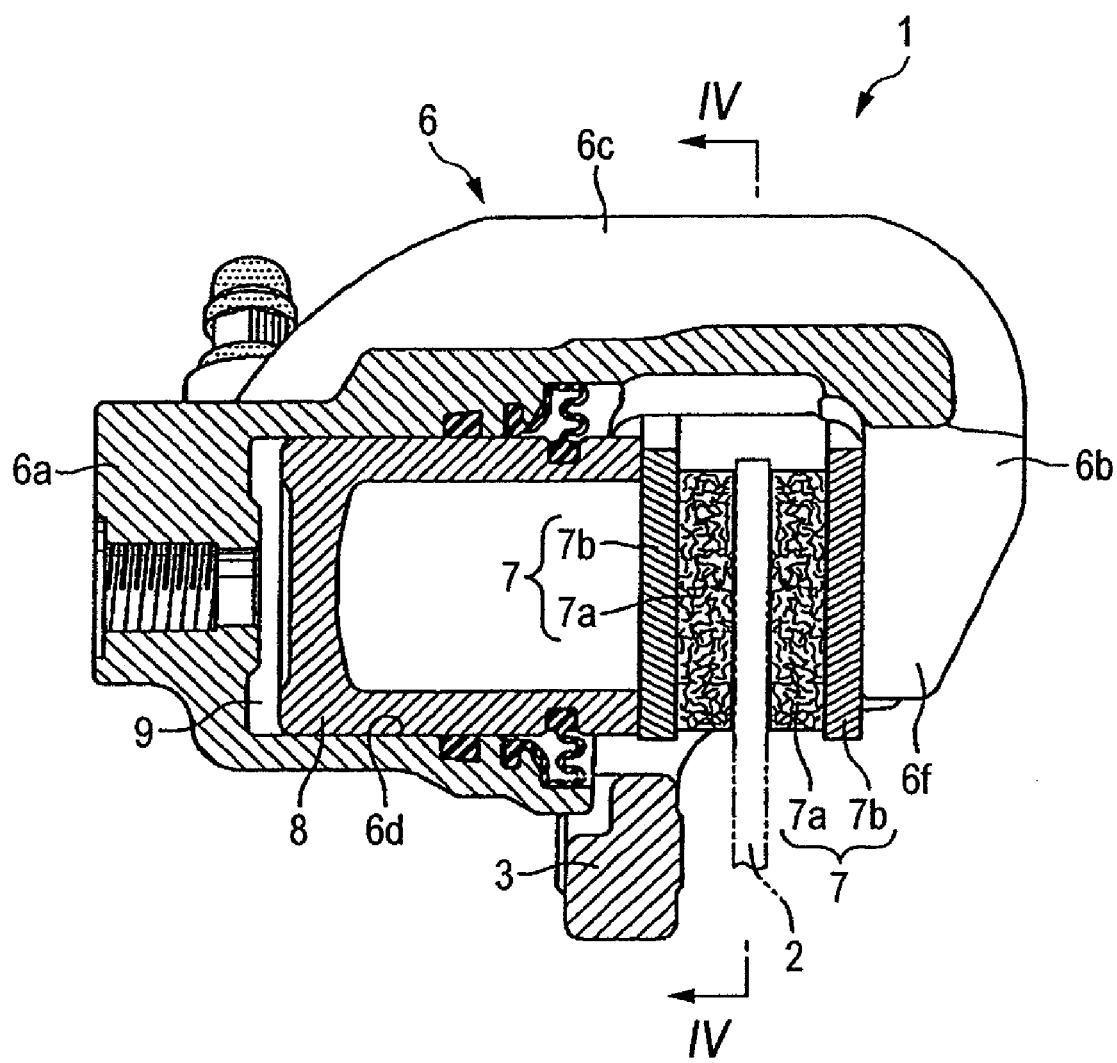
FIG. 3 is a sectional view taken on line III-III in FIG. 2.
Figure 4:
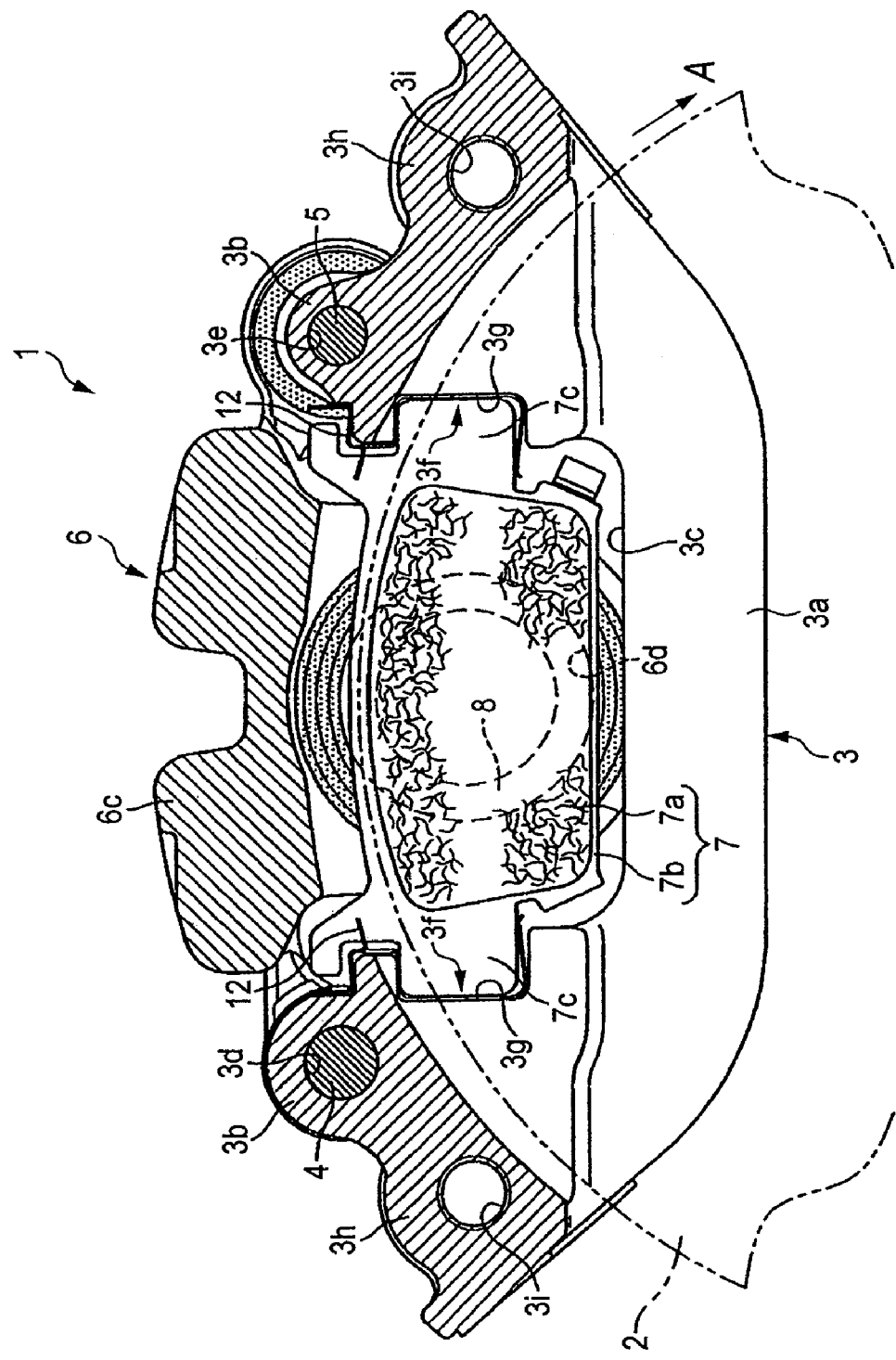
FIG. 4 is a sectional view taken on line IV-IV in FIG. 3.
Figure 5:
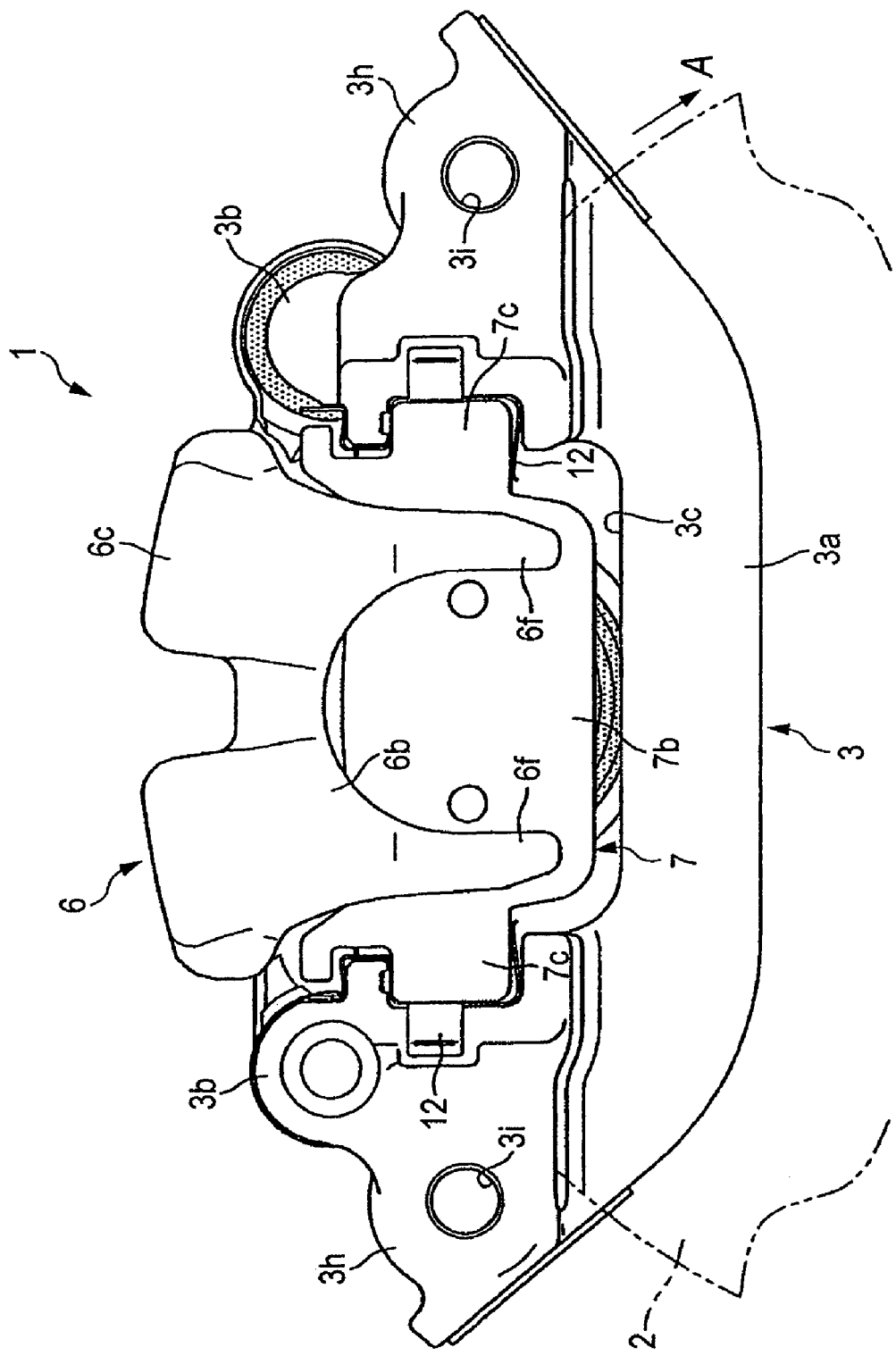
FIG. 5 is a rear view of a disc brake of the first embodiment of the present invention.
Figure 6:
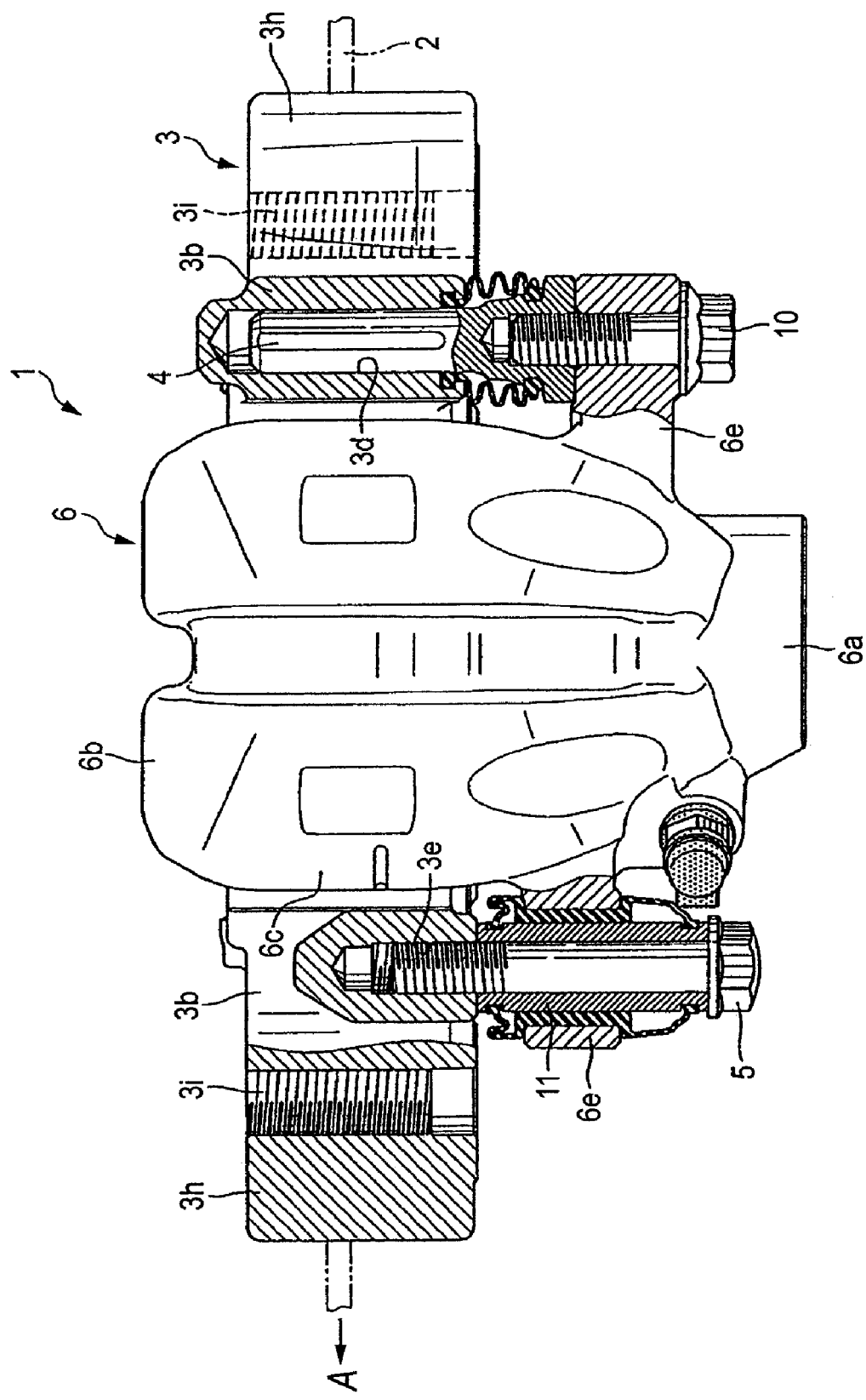
FIG. 6 is a partially sectional plan view of a disc brake of the first embodiment of the present invention.

Referring to the drawings, the first embodiment of the present invention will be explained in detail as follows. FIGS. 1 to 6 are views showing the first embodiment of the disc brake for a vehicle of the present invention. FIG. 1 is a front view of the caliper bracket, FIG. 2 is a front view of the disc brake, FIG. 3 is a sectional view taken on line III-III in FIG. 2, FIG. 4 is a sectional view taken on line IV-IV in FIG. 3, FIG. 5 is a rear view of the disc brake, and FIG. 6 is a partially sectional plan view of the disc brake. Arrow A in the drawing shows a direction of the rotation of the disc rotor at the time when the vehicle runs forward. The rotation come-in side and the rotation come-out side of the disc brake used in the following explanations show a case in which the vehicle runs forward.

In a disc brake 1, a caliper bracket 3 is fixed to a vehicle body 6 on one side of a disc rotor 2, and the caliper body is supported by the caliper bracket 3 via slide pins 4, 5 in such a manner that the caliper body 6 can be moved in axial direction of the disc rotor. Between an acting section 6a and a reacting section 6b of the caliper body 6, a pair of frictional pads 7, 7 are arranged being opposed to each other while the disc rotor 2 is being interposed between the frictional pads 7, 7.

The caliper bracket 3 includes a bracket body 3a and a pair of caliper support arms 3b, 3b protruding from the bracket body 3a in the axial direction of the disc rotor while the pair of caliper support arms 3b, 3b are striding across the outside of the disc rotor 2. The appearance of the bracket body 3a is a substantial U-shape when its front side is viewed. At a center of the bracket body 3a, a accommodating recess portion 3c for accommodating the frictional pads 7, 7 is formed, and the caliper support arms 3b, 3b are protruded onto both sides in the circumferential direction of the disc rotor.

The caliper support arms 3b, 3b are formed into a straight line shape which extends from the reacting section 6b side to the acting section 6a. Inside the caliper support arm 3b on the disc rotation come-in side, the bag-shaped pin insertion hole 3d is provided being open onto the acting section side, and the female screw hole 3e is provided in the caliper support arm 3b on the disc rotation come-out side being open onto the acting section side. On the piston side opposing faces on the outer faces of the caliper support arms 3b, 3b, C-shaped torque receiving sections 3f, 3f for receiving the braking torque from the frictional pads 7, 7 are formed being opposed to each other, and torque receiving faces 3g, 3g are formed in the most inner portions in the disc rotating direction of the torque receiving sections 3f, 3f.

In the caliper support arms 3b, 3b located on the opposite side to the frictional pad side of the torque receiving sections 3f, 3f, a pair of vehicle body attaching sections 3h, 3h are arranged close to the torque receiving sections 3f, 3f. In these vehicle body attaching sections 3h, 3h, mounting holes 3i, 3i for attaching the mounting bolts are formed. When, mounting bolts (not shown in the drawing) inserted from the vehicle body side are screwed into the mounting holes 3i, 3i, the carrier bracket 3 is fixed to the vehicle body.

The caliper body 6 includes: an acting section 6a and a reacting section 6b which are arranged on both sides of the disc rotor 2 being opposed to each other; and a bridge section 6c for connecting the acting section 6a with the reacting section 6b while striding across the outside of the disc rotor. At the center of the acting section 6a, the cylinder hole 6d is open onto the disc rotor 2 side. The piston 8 is accommodated in the cylinder hole 6d, and the hydraulic chamber 9 is defined between the piston 8 and the bottom face of the cylinder hole 6d.

The cylinder hole 6d, the torque receiving faces 3g, 3g and the mounting holes 3i, 3i are arranged in a range in which the centers C1, C1 of the mounting holes 3i, 3i and the center C2 of the cylinder hole 6d are interposed between the first base line L1 for connecting the outside ends in the radial direction of the disc rotor of the opposed torque receiving faces 3g, 3g and the second base line L2 for connecting the inside ends in the radial direction of the disc rotor of the opposed torque receiving faces 3g, 3g. The torque receiving faces 3g, 3g are formed in parallel with the third base line L3 which passes at the center C2 of the cylinder hole 6d and is perpendicular to the disc axis A1. Further, the first base line L1 and the second base line L2 are formed being perpendicular to the third base line L3.

On the disc rotation come-in side and the disc rotation come-out side of the acting section 6a, the bracket attaching arms 6e, 6e are protruded along one side of the disc rotor 2. At the forward end of the bracket attaching arm 6e on the disc rotation come-in side, a slide pin 4 is attached by the fixing bolt 10 being protruded in parallel with the disc shaft A1. In the bracket attaching arm 6e on the disc rotation come-out side, the other slide pin 5 is inserted via the collar 11. The slide pin 4 on the disc rotation come-in side is inserted into the pin insertion hole 3d of the caliper support arm 3b. The slide pin 5 on the disc rotation come-out side is screwed to the female screw hole 3 of the caliper support arm 3b. The caliper body 6 is moved in the axial direction of the disc being guided by the slide pins 4, 5.

Each friction pad 7 includes: a lining 7a slidably coming into contact with the side of the disc rotor 2; and a back board 7b made of metal for holding the lining 7a. On the back board 7b, the torque transmitting sections 7c, 7c, which protrude in the disc rotation come-out direction and the disc rotation come-in direction, are respectively provided. The torque transmitting sections 7c, 7c are supported by the torque receiving sections 3f, 3f via the retainers 12, 12.

The first embodiment of the present invention is composed as described above. When an operator conducts a braking operation, hydraulic fluid, the pressure of which is raised, is supplied to the hydraulic chamber 9 of the caliper body 6. Then, the piston 8 goes forward toward the opening portion in the cylinder hole 6d and pushes the frictional pad 7 on the acting section 6a side so that the lining 7a of the frictional pad 7 can be pushed to one side of the disc rotor 2. Then, by the reaction, the caliper body 6 is moved toward the acting section 6a being guided by the slide pins 4, 5. The reacting pawl 6f of the reacting section 6b pushes the frictional pad 7 on the reacting section 6b side, so that the lining 7a of the frictional pad 7 can be pushed toward the other side of the disc rotor 2. In this way, the braking action is performed.

At this time, the vehicle body attaching sections 3h, 3h are arranged close to the torque receiving sections 3f, 3f, and the center C1 of the mounting hole 3i for the mounting bolt is located between the first base line L1 and the second base line L2. Therefore, the braking torque received by the torque receiving faces 3g, 3g of the torque receiving sections 3f, 3f can be directly received by the mounting bolt arranged close to the torque receiving faces 3g, 3g. When the torque receiving face 3g is formed in parallel with the third base line L3, further when the first base line L1 and the second base line L2 are formed being perpendicular to the third base line L3, the braking torque received by the torque receiving face 3g can be straight and more effectively transmitted to the mounting bolt.

Further, since a pair of mounting bolts are arranged on a substantially straight line on both sides of the center C2 of the cylinder hole 6d, the caliper bracket 3 can be attached to the vehicle body by these mounting bolts being well balanced, and a tilt and twist of the caliper bracket 3 in the axial direction of the disc generated at the time of braking can be suppressed. Due to the foregoing, the brake feeling can be enhanced. Further, the occurrence of partial abrasion of the linings 7a, 7a of the frictional pads 7, 7 can be suppressed, and dragging of the frictional pads 7, 7 can be suppressed. Furthermore, since the mounting bolts can be made to function as reinforcing members, while the increases in the weight and the size of the caliper bracket 3 are being suppressed, the attaching strength of the caliper bracket 3 to the vehicle body can be enhanced.

Figure 7:
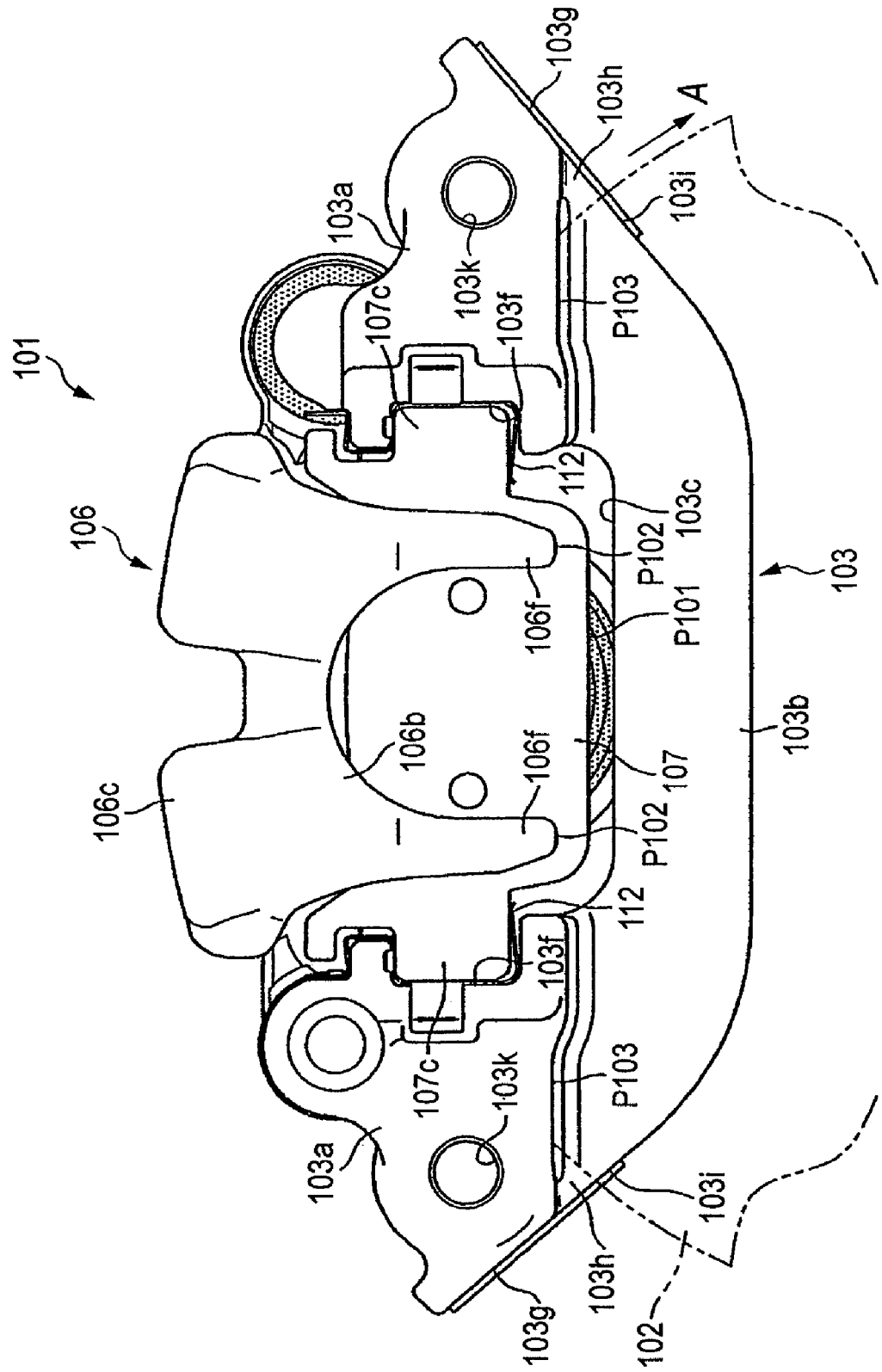
FIG. 7 is a front view showing a disc brake of the second embodiment of the present invention.
Figure 8:
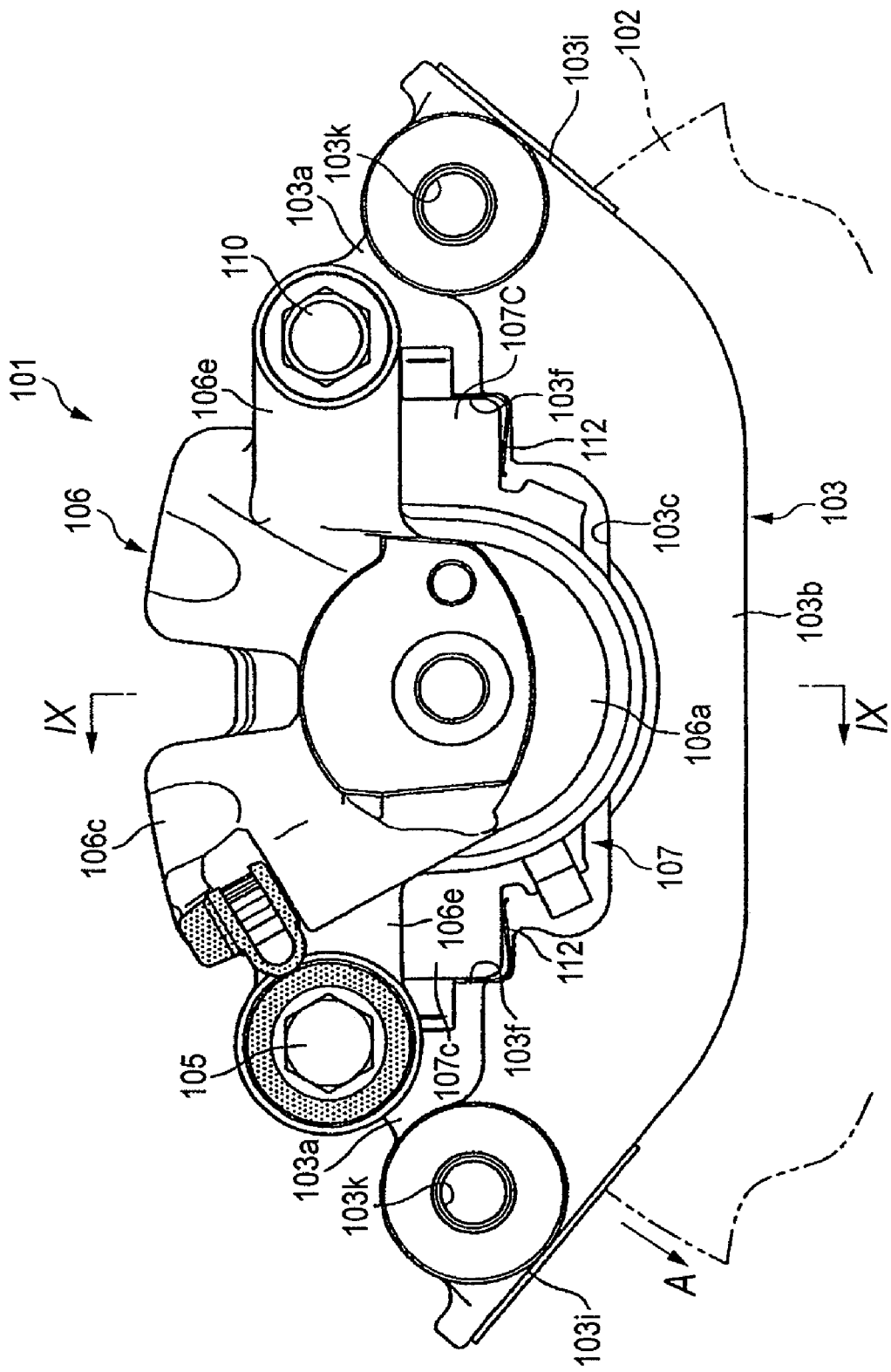
FIG. 8 is a rear view showing a disc brake of the second embodiment of the present invention.
Figure 9:
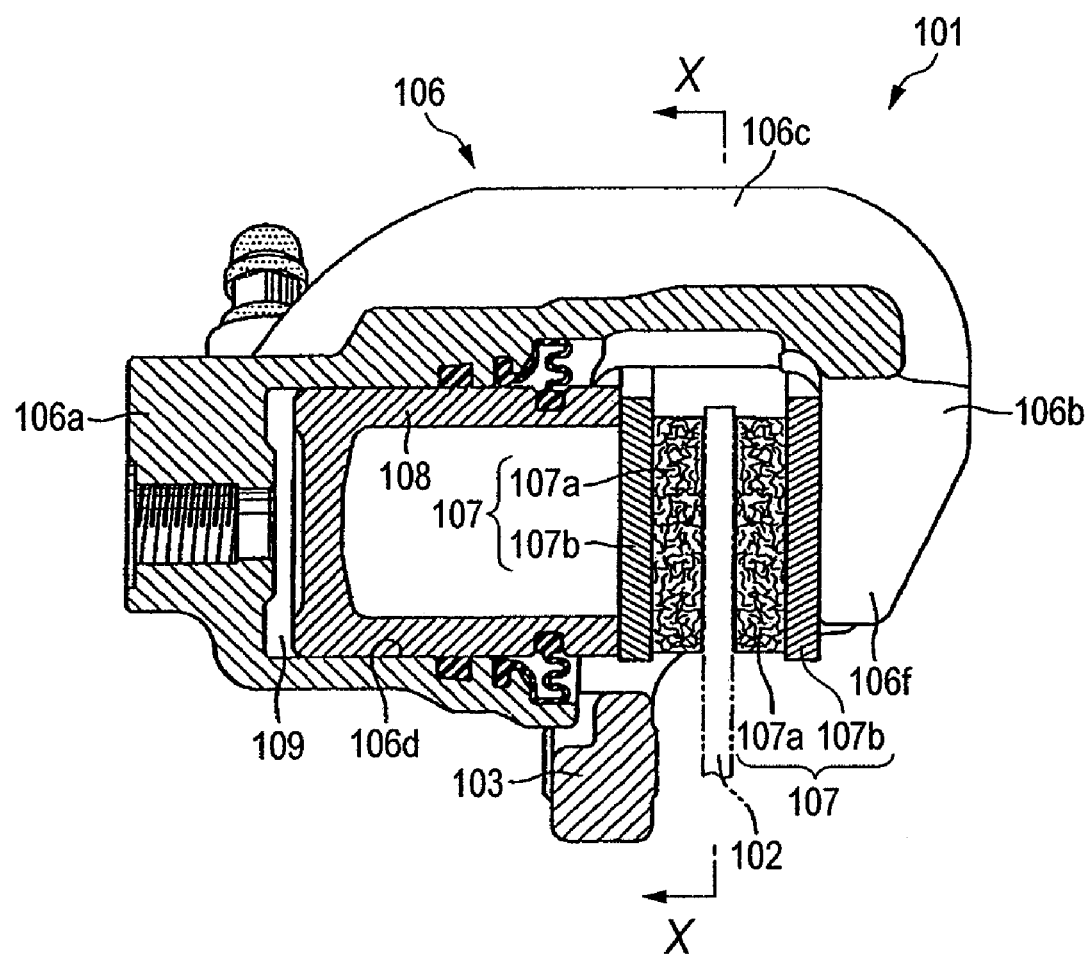
FIG. 9 is a sectional view taken on line IX-IX in FIG. 8.

Referring to the drawings, a second embodiment of the present invention will be explained in detail as follows. FIGS. 7 to 10 are views showing a first embodiment of the disc brake for vehicle use of the present invention. FIG. 7 is a front view of the disc brake, FIG. 8 is a rear view of the disc brake, FIG. 9 is a sectional view taken on line IX-IX in FIG. 8, FIG. 10 is a sectional view taken on line X-X in FIG. 9. Arrow A in the drawing shows a direction of the rotation of the disc rotor at the time when the vehicle runs forward. The rotation come-in side and the rotation come-out side of the disc brake described in the following explanations show a case in which the vehicle runs forward.

In the disc brake 101, the caliper bracket 103 is fixed to the vehicle body on one side of the disc rotor 102, and the caliper body 106 is supported by the caliper bracket 103 via the slide pins 104, 105 in such a manner that the caliper body 106 can be moved in the axial direction of the disc rotor. Between the acting section 106a and the reacting section 106b of the caliper body 106, a pair of friction pads 107, 107 are arranged being opposed to each other while the disc rotor 102 is being interposed between the friction pads 107, 107.

The caliper bracket 103 includes: a pair of caliper support arms 103a, 103a striding across the outside of the disc rotor 102 and protruding in the axial direction of the disc rotor; and a connecting arm 103b for connecting both end portions of the caliper support arms 103a, 103a. The connecting arm 103b is provided only on the acting section side and the front face of connecting arm 103b is formed into a substantial U-shape. At the center of the connecting arm 103b, the accommodating recess portion 103c for accommodating the friction pad 107 on the acting section side is formed. The connecting arm 103b is connected to the caliper support arms 103a, 103a on both sides in the circumferential direction of the disc rotor.

The caliper support arms 103a, 103a are formed into a straight line shape which extends from the reacting section 106b side to the acting section 106a. Inside the caliper support arm 103a on the disc rotation come-in side, the bag-shaped pin insertion hole 103d is provided being open onto the acting section side, and the female screw hole 103e is provided in the caliper support arm 103a on the disc rotation come-out side being open onto the acting section side. On the piston side opposing faces on the outer faces of the caliper support arms 103a, 103a, the C-shaped torque receiving sections 103f, 103f for receiving the braking torque from the friction pads 107, 107 are formed being opposed to each other.

Both end faces of the caliper support arms 103a, 103a in the circumferential direction of the disc rotor are formed into the inclined faces 103g, 103g on which the outside of the disc rotor 102 in the radial direction is expanded. In other words, the inclined faces 103g, 103g are formed such that distance defined between radial direction inner edge faces of the caliper bracket is set shorter than distance defined between outer peripheral faces of the caliper bracket. Both end faces of the connecting sections 103h, 103h in the circumferential direction of the disc rotor, by which the connecting arm 103b and the caliper support arms 103a, 103a are connected with each other, are formed into the continuous inclined faces 103i, 103i corresponding to the inclined faces 103g, 103g.

In the caliper support arms 103a, 103a located on the opposite side to the friction pad side of the torque receiving sections 103f, 103f, a pair of vehicle body attaching sections 103h, 103h are arranged close to the torque receiving sections 103f, 103f. In these vehicle body attaching sections 103h, 103h, the mounting holes 103k, 103k for attaching the mounting bolts are formed. When, mounting bolts (not shown in the drawing) inserted from the vehicle body side are screwed into the mounting holes 103k, 103k, the carrier bracket 103 is fixed to the vehicle body.

The caliper body 106 includes: an acting section 106a and a reacting section 106b which are arranged on both sides of the disc rotor 102 being opposed to each other; and a bridge section 106c for connecting the acting section 106a with the reacting section 106b while striding across the outside of the disc rotor. At the center of the acting section 106a, the cylinder hole 106d is open onto the disc rotor 102 side. The piston 108 is accommodated in the cylinder hole 106d, and the hydraulic chamber 109 is defined between the piston 108 and the bottom face of the cylinder hole 106d.

On the disc rotor rotation come-in side and the disc rotor rotation come-out side of the acting section 106a, the bracket attaching arms 106e, 106e are protruded along one side of the disc rotor 102. At the forward end of the bracket attaching arm 106e on the disc rotation come-in side, one slide pin 104 is attached by the fixing bolt 110 being protruded in parallel with the disc shaft. In the bracket attaching arm 106e on the disc rotation come-out side, the other slide pin 105 is inserted via the collar 11. The slide pin 104 on the disc rotation come-in side is inserted into the pin insertion hole 103d of the caliper support arm 103a. The slide pin 105 on the disc rotation come-out side is screwed into the female screw hole 103 of the caliper support arm 103a. The caliper body 106 is moved in the axial direction of the disc being guided by the slide pins 104, 105. The reacting pawl 106f for pushing the friction pad 107 on the reacting section side is provided in the reacting section 106b.

Each pad 107 includes: a lining 107a slidably coming into contact with the side of the disc rotor 102; and a back board 107b made of metal for holding the lining 107a. On the back board 107b, the torque transmitting sections 107c, 107c, which protrude in the disc rotation delivery direction and the disc rotation entry direction, are respectively provided. The torque transmitting sections 107c, 107c are supported by the torque receiving sections 103f, 103f via the retainers 112, 112.

The friction pad 107 arranged on the reacting section 106b side, the reacting pawl 106f and the caliper support arms 103a, 103a are formed so that the inner end face P101 of the friction pad on the inside in the radial direction of the disc rotor of the back board 107b of the friction pad 107 arranged on the reacting section 106b side, the inner end faces P102, P102 of the reacting pawl 106f on the inside in the radial direction of the disc rotor of the reacting pawl 106f and the inner end faces P103, P103 of the caliper bracket on the inside in the radial direction of the disc rotor located on the reacting section 106b side of the caliper support arms 103a, 103a can be linearly arranged. Also, the inner end face P101 of the friction pad, the inner end faces P102, P102 of the reacting pawl and the inner end faces P103, P103 of the caliper bracket are formed into flat faces.

When the inner end face P101 of the friction pad, the inner end face P102 on the inner end face of the reacting pawl and the inner end face P103 on the inner end face of the caliper bracket are linearly arranged as described above, the reacting section 106b side can be put into a simple state of the structure. Therefore, even when earth and sand get into the peripheries of the friction pads 107, 107, the earth and sand can be quickly discharged without being made to stay in the peripheries of the friction pads 107, 107. Further, when both end faces in the circumferential direction of the disc rotor of the portion on the reacting section side in the caliper support arms 103a, 103a are formed into an inclined face 103g, the outside in the radial direction of the disc rotor of which is expanded with respect to the inner end face P103 of the caliper bracket. Due to the foregoing, the earth and sand can be smoothly discharged. In addition to that, both end faces in the circumferential direction of the disc rotor of the portion located on the acting portion side are made into an inclined face corresponding to the above inclined face 103g. Due to the foregoing, the earth and sand can be more smoothly discharged.

Both end faces in the circumferential direction of the disc rotor of the connecting arm 103b are made into the inclined faces 103i, 103i which are continuously formed with respect to the inclined faces 103g, 103g. Therefore, the earth and sand can be quickly discharged from this portion. Especially when the connecting arm 103b is provided only on the acting section side, a portion in which the earth and sand stay on the reacting section side can be reduced. Accordingly, the earth and sand can be more quickly discharged from the reacting section side.

In this connection, the implication of linearly arranging the inner end face P101 of the friction pad, the inner end face P102 of the reacting pawl and the inner end face P103 of the caliper bracket is not limited to the implication that the faces P101, P102 and P103 are strictly positioned so that they can be arranged along one straight line, that is, the implication of linearly arranging the faces P101, P102 and P103 includes that the faces P101, P102 and P103 are substantially linearly arranged.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A disc brake for a vehicle, comprising:
   a caliper body including:
      an acting section having a cylinder hole and provided on a first side of a disc rotor;
      a reacting section provided on a second side of the disc rotor; and
      a bridge section striding across an outside of the disc rotor and integrally connecting the acting section with the reacting section;
   a pair of friction pads provided between the acting section and the reacting section through the disc rotor so as to oppose each other,
   a caliper bracket fixed to a vehicle body via a pair of mounting bolts, the caliper bracket having:
      a mount hole for the mounting bolt; and
      a torque receiving face which receives braking torque from the friction pad and provided on both sides of the caliper bracket in a circumferential direction of the disc rotor so as to oppose to each other; and
   a pair of slide pins supporting the caliper body so that the caliper body is capable of sliding in an axial direction of the disc rotor,
   wherein a first base line is defined so as to pass through both radially out side faces of the torque receiving face,
   a second base line is defined so as to pass through both radially inner side faces of the torque receiving face, and
   a center of the mount hole of the mounting bolt and a center of the cylinder hole are located in an area defined between the first and second base lines.

2. The disc brake according to claim 1, wherein the torque receiving face is formed so as to be parallel with a third base line which passes at the center of the cylinder hole and is perpendicular to an axis of the disc rotor.

3. The disc brake according to claim 1, wherein the first and the second base lines are perpendicular to the third base line which passes at the center of the cylinder hole and is perpendicular to an axis of the disc rotor.

4. The disc brake according to claim 1, wherein the friction pad is supported on the torque receiving face via a retainer.

5. The disc brake according to claim 1, wherein the friction pad provided on the reacting section has a friction pad inner end face which is located at a radial direction inner side of the disc rotor,
   a reacting pawl provided on the reacting section has a reacting pawl inner end face which is located at the radial direction inner side of the disc rotor,
   the caliper bracket has a caliper bracket inner end face, which is located at the radial direction inner side of the disc rotor, on a reacting section side, and
   the friction pad inner end face, the reacting pawl inner end face and the caliper bracket inner end face are substantially linearly arranged.

6. The disc brake according to claim 5, wherein the caliper bracket has both reacting section side end faces which are located at both ends of the circumferential direction of the disc rotor and provided on the reacting section side,
   both of the reacting section end faces are formed into inclined faces in such a manner that an outside of the caliper bracket in the radial direction of the disc rotor expands relative to the caliper bracket inner end face.

7. The disc brake according to claim 6, wherein the caliper bracket has both acting section side end faces which are located at both ends of the circumferential direction of the disc rotor and provided on the acting section side of the caliper bracket, and
   both of the acting section side end faces are formed in accordance with the inclined face.

8. The disc brake, according to claim 7, wherein the caliper bracket has a connecting arm which connects both of the acting section side end face to both of the reacting section side end face, respectively, and
   both end faces of the connecting arm in the circumferential direction of the disc rotor are formed in accordance with the inclined face.

9. The disc brake according to claim 8, wherein the connecting arm is provided only on the acting section side of the caliper bracket.

10. The disc brake according to claim 5, wherein the friction pad inner end face, the reacting pawl inner end face and the caliper bracket inner end face are formed into substantially flat faces.

11. A disc brake for a vehicle, comprising:
    a caliper body having:
        an acting section and a reacting section which are arranged on both sides of a disc rotor being opposed to each other, the reacting section having a reacting pawl; and
        a bridge section striding across an outside of the disc rotor and connecting the acting section with the reacting section;
    a caliper bracket fixed to a vehicle body and supporting the caliper body via a pair of slide pins so that the caliper body is capable of sliding in an axial direction of the disc rotor, and
    a pair of friction pads provided between the acting section and the reacting section through the disc rotor so as to oppose each other,
    wherein the friction pad on the reacting section has a friction pad inner end face which is located at a radial direction inner side of the disc rotor,
    the reacting pawl provided on the reacting section has a reacting pawl inner end face which is located at a radial direction inner side of the disc rotor,
    the caliper bracket has a caliper bracket inner end face, which is located at the radial direction inner side of the disc rotor, on a reacting section side, and
    the friction pad inner end face, the reacting pawl inner end face and the caliper bracket inner end face are substantially linearly arranged.

12. The disc brake according to claim 11, wherein the caliper bracket has both reacting section side end faces, which are located at both ends of the circumferential direction of the disc rotor and provided on the reacting section side,
    the reacting section end faces are formed into inclined face in such a manner that an outside of the caliper bracket in the radial direction of the disc rotor expands relative to the caliper bracket inner end face.

13. The disc brake according to claim 12, wherein the caliper bracket has both acting section side end faces, which are located at both ends of the circumferential direction of the disc rotor and provided on the acting section side of the caliper bracket are formed in accordance with the inclined face.

14. The disc brake according to claim 13, wherein the caliper bracket has a connecting arm which connects both of the acting section side end faces with
    both of the reacting section side end faces, respectively, and both end faces of the connecting arm in the circumferential direction of the disc rotor are formed in accordance with the inclined face.

15. The disc brake according to claim 14, wherein the connecting arm is provided only on the acting section side of the caliper bracket.

16. A disc brake for a vehicle, comprising:
    a caliper body; and
    a caliper bracket attached to the caliper body, the caliper bracket comprising:
        a torque receiving face on a first side and second side of the caliper bracket in a circumferential direction of a disc rotor;
        a first base line passing through first side faces of the torque receiving face, the first side faces being outside of the disc rotor, and
        a second base line passing through second side faces of the torque receiving face, the second side faces being inside of the disc rotor,
        wherein a center of a mount hole of a mounting bolt which couples the caliper bracket to a vehicle body is provided between the first base line and the second base line.

17. The disc brake according to claim 16, wherein the caliper body comprises:
    an acting section having a cylinder hole and provided on a first side of the disc rotor;
    a reacting section provided on a second side of the disc rotor; and
    a bridge section striding across an outside of the disc rotor and integrally connecting the acting section with the reacting section.

18. The disc brake according to claim 17, wherein the torque receiving face is formed so as to be parallel with a third base line which passes at a center of the cylinder hole and is perpendicular to an axis of the disc rotor, and the first and the second base lines are perpendicular to the third base line which passes at the center of the cylinder hole and is perpendicular to an axis of the disc rotor.

19. The disc brake according to claim 17, wherein an inner end face of the friction pad, an end face of a reacting pawl of the reacting section and an inner end face of the caliper bracket are formed into substantially flat faces.

20. The disc brake according to claim 16, further comprising a pair of friction pads provided between an acting section and reacting section of the caliper body, wherein
- a reacting pawl provided on the reacting section has a reacting pawl inner end face which is located at a radial direction inner side of the disc rotor,
- the caliper bracket has a caliper bracket inner end face, which is located at the radial direction inner side of the disc rotor, on a reacting section side, and
- a friction pad inner end face, the reacting pawl inner end face and the caliper bracket inner end face are substantially linearly arranged.

* * * * *